June 26, 1934.  F. W. MERRILL  1,964,589
ELECTRIC DRIVE
Original Filed June 16, 1932
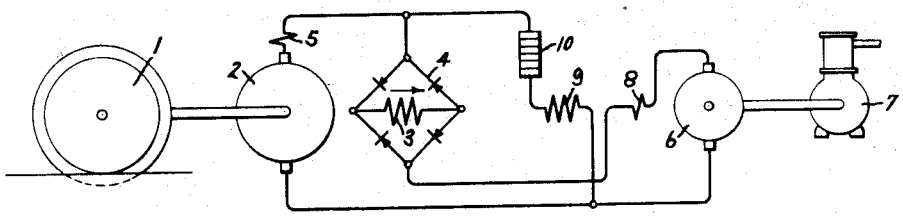
Inventor:
Frank W. Merrill,
by Chas. E. Mullen
His Attorney.

Patented June 26, 1934

1,964,589

UNITED STATES PATENT OFFICE 1,964,589

ELECTRIC DRIVE

Frank W. Merrill, Fort Wayne, Ind., assignor to General Electric Company, a corporation of New York Application June 16, 1932, Serial No. 617,586
Renewed November 15, 1933

3 Claims. (Cl. 172—239)

My invention relates broadly to electric drives and more particularly to an electric drive for operating a mechanical load, over a relatively narrow speed range, from a primary source of rotation having a relatively wide range of speed.

Still more particularly, my invention is an improvement on the electric drive disclosed and broadly claimed in an application of W. C. Harris, Serial No. 610,393, filed May 10, 1932, and assigned to the assignee of the present application. In the embodiment disclosed in the Harris application, a direct current series generator is arranged to be driven by the source of primary rotation and this generator is connected electrically to a direct current motor, which in turn drives the load device. The motor is provided with a shunt field winding and in series with this field winding is a negative resistance-current characteristic resistance. The purpose of the negative resistance-current characteristic resistance is to produce a disproportionate change in field current with changes in voltage applied to the motor. The reason that this is desirable is that in the operation of this system the counter-electromotive force of the motor should preferably change, substantially directly proportionally with changes in voltage applied to the motor, so as to minimize motor speed changes with changes in applied voltage. Magnetic saturation in the motor would ordinarily prevent this taking place and consequently the negative resistance-current characteristic device acts to compensate for saturation in the motor. The operation of the Harris system is briefly as follows: As the speed of the generator increases its voltage increases, but as the flux produced in the motor increases substantially directly proportionally with the increase in voltage, there is little or no tendency for the motor to change its speed. Consequently, if the motor is operating at constant load, its current must decrease with increases in voltage. This decrease in current tends to limit the voltage rise of the generator and the limited voltage rise means that over a wide range of generator speed the motor will operate at substantially constant speed, or at least over a greatly reduced speed range.

I have found that, although the total current required by the motor decreases considerably with increases in speed of the generator, the decrease in motor armature current is very much greater than the decrease in total motor current due to the fact that as the voltage of the generator increases with increases in its speed, the current through the shunt field winding circuit including the negative resistance-current characteristic resistance increases at a disproportionate rate so that this current increase is relatively large.

In accordance with my invention I connect the motor to the generator in such a manner that only the armature current of the motor will flow through the series winding of the generator, while the current required by the shunt field winding circuit of the motor will flow only through the armature of the generator. In this manner, the motor may be operated satisfactorily over a much wider range in generator speed because, as the generator is a series machine, its voltage varies with its series field winding current and if the range of decrease of the series field winding current is increased so as to more nearly compensate for the increased voltage produced by the increase in speed, the allowable voltage range may be maintained over a much wider range in speed of the generator.

It is an object of my invention to provide an improved electric drive.

My invention will be better understood from the following description, taken in connection with the accompanying drawing, and its scope will be pointed out in the appended claims.

In the single figure of the accompanying drawing, 1 is a primary source of widely varying speed rotation, such for example as a railway car wheel. The range of speed of such a device is often 1 to 5 corresponding to a car speed range of 15 to 75 miles per hour. Mechanically connected to wheel 1, so as to be driven thereby, is a direct current series generator 2 having a series field winding 3. Field winding 3 is connected in the armature circuit of generator 2 through a full wave type rectifier 4 for the purpose of insuring that the generator will build up voltage regardless of its direction of rotation. This is important in car axle driven systems where the direction of rotation is reversible. The rectifier insures that the current through the field winding will always be in the same direction regardless of the polarity of the armature of generator 2, and consequently this machine can use its residual magnetism to build up voltage regardless of its initial direction of rotation. It is preferable, but not necessary, to build the generator with carbon steel field poles so as to give it a strong residual magnetism which cannot easily be accidentally reversed. Generator 2 may also be provided with a commutating winding 5, if desired.

Connected in series with both the armature and series field winding of machine 2 is the armature of a direct current motor 6, which is mechanically coupled to drive any load which is adapted to operate at substantially constant speed, or over a relatively small speed range, such, for example, as a fan, or refrigerator compressor 7. Motor 6 is preferably provided with a relatively weak series field winding 8, the purpose of which is to produce a sufficiently strong field to cause motor 6 to start turning at the low voltage values of generator 2 when the latter is just starting to operate. Under such conditions the current produced by generator 2 will flow through the relatively low resistance path including its series field winding and the armature of the motor 6 and unless some means is provided to cause this motor to start turning the current my reach 200 or 300% of full load and injure the motor. However, as soon as it starts to turn it produces a counter E. M. F. and this limits the current flow. At these low voltage values an ordinary shunt winding would possibly not produce sufficient flux to start the motor until it had been greatly overheated by carrying excessive current.

Motor 6 is also provided with a shunt type field winding 9 connected in series with which is a negative resistance-current characteristic resistance 10. A specific example of a preferred type of resistance of this character is the resistance material described and claimed in Patent No. 1,822,742, granted September 8, 1931, on an application of Carl B. McEachron and assigned to the assignee of the present application. The circuit including shunt type field winding 9 and resistance 10 is connected directly across the armature of generator 2 so that the current required by this circuit does not flow through the series field winding 3.

The operation of this general type of electric drive has been described above. Due to my improved connection the portion of the motor current which increases with increases in applied voltage, that is to say, the current required by the shunt type field winding 9 and the special resistance 10, does not flow through the series field winding 3 of the generator and therefore does not have any effect tending to increase the voltage of this generator. Thus, the portion of the current of the motor 6 which decreases with increases in voltage of the generator, that is to say, the armature current of motor 6, all flows through the series field winding 3 of the generator and consequently this decreasing current has a maximum effect in limiting the voltage rise of the generator over a given speed range of the generator, and consequently the speed range of this generator may be increased for a given voltage range of the generator over the speed range which would be obtained when the connection is such that the shunt field current of the motor must also flow through the series field winding of the generator.

In a particular drive of this type in which the speed range of the generator is 1 to 5, the decrease in total current required by the motor, that is to say, the current required by both its armature and field winding circuits, is 26% while the decrease in armature current is 64%. With my invention, I utilize the entire 64% decrease to improve the regulation of the system, whereas in the system in which the motor field winding current passes through the field winding circuit of the generator, only the 26% decrease is employed.

While I have shown and described a particular embodiment of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States is:

1. In combination, a direct current series generator, a direct current motor having an armature and a field winding, the armature of said motor being connected in a series circuit with the armature and field winding of said generator, and the field winding of said motor being connected across only the armature of said generator.

2. In combination, a variable speed driven direct current series generator, a direct current motor, a field winding circuit for said motor having a negative effective resistance-current characteristic, the armature of said motor being connected to the armature of said generator through the series field winding of said generator, and the field winding circuit of said motor being connected directly across the armature of said generator.

3. In combination, a variable speed driven direct current series generator, a mechanical load adapted to be driven over a speed range which is less than the speed range of said generator, a direct current compound motor for driving said load, a series circuit including the armatures and series field windings of said generator and motor, a negative resistance-current characteristic resistance, and a circuit including said resistance and the shunt field winding of said motor connected directly across the armature of said generator so that the current required by said circuit does not pass through the series field winding of said generator.

FRANK W. MERRILL.